J. W. LITTLE & C. W. KELLEY.
HAY RAKE OR SWEEP RAKE.
APPLICATION FILED AUG. 3, 1910.
1,002,165.
Patented Aug. 29, 1911.
2 SHEETS—SHEET 2.
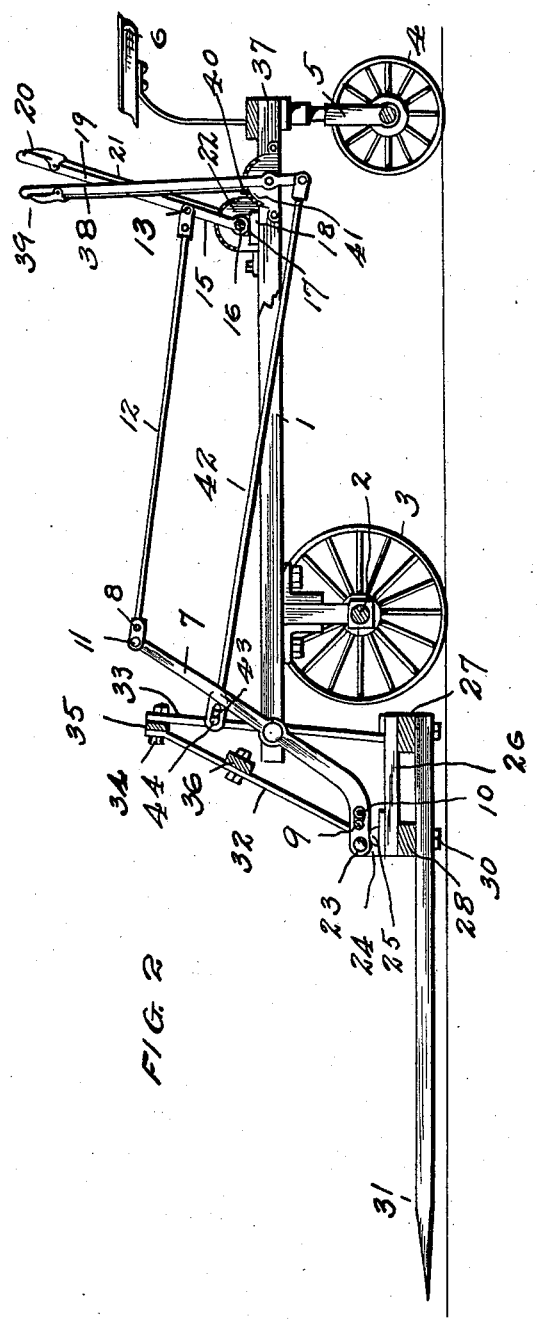
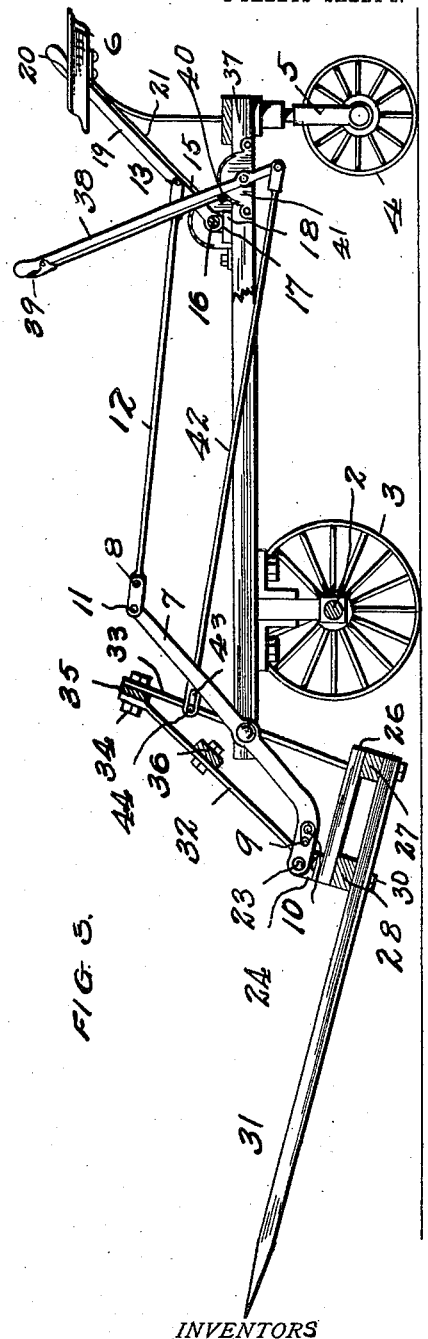
WITNESSES
Chas. K Davis
H K Parsons
INVENTORS
J. W. Little
C. W. Kelley
by W. N. Moore Attorney

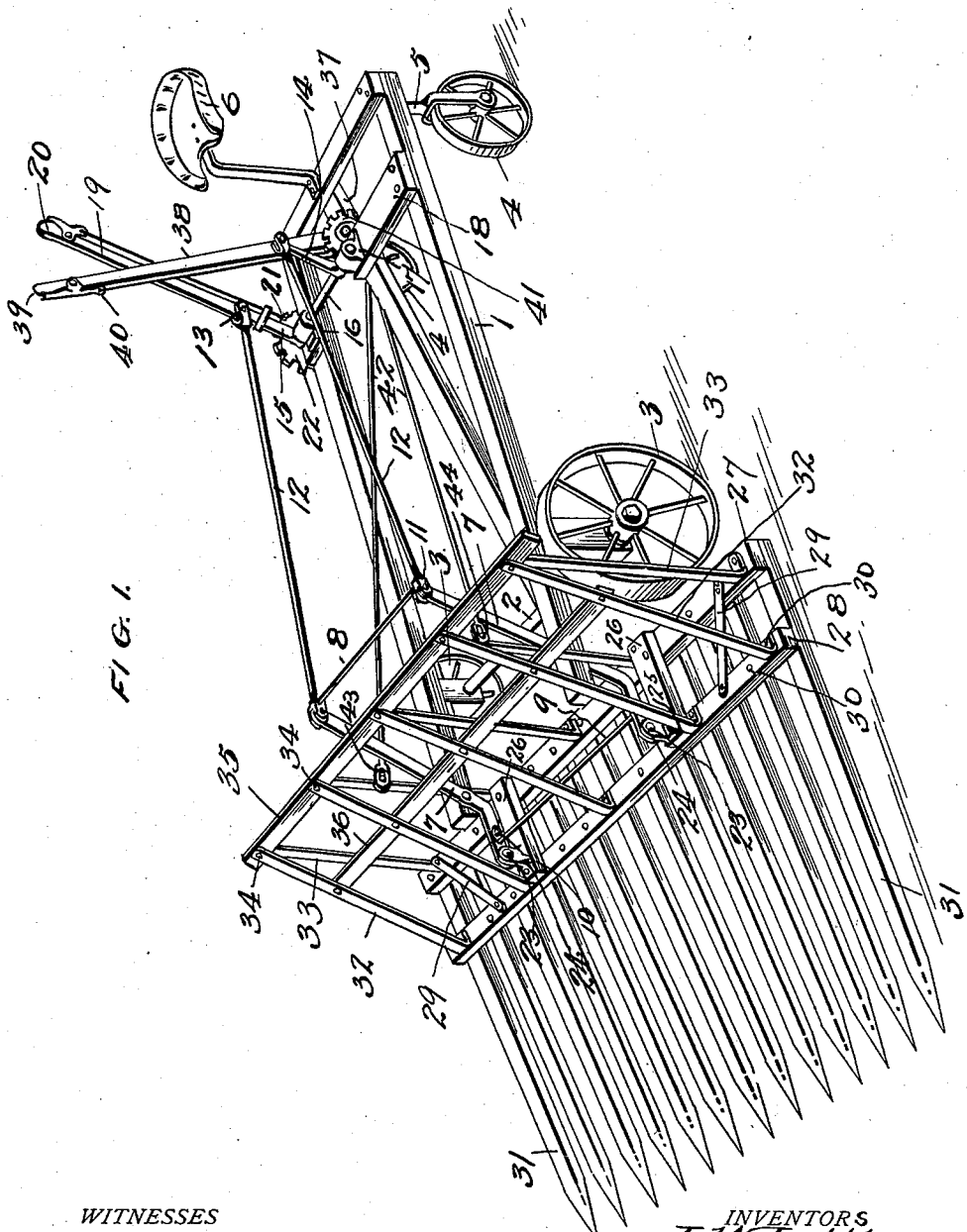

UNITED STATES PATENT OFFICE.

JOHN W. LITTLE AND CHARLES W. KELLEY, OF McCOOK, NEBRASKA.

HAY-RAKE OR SWEEP-RAKE.

1,002,165. Specification of Letters Patent. Patented Aug. 29, 1911.

Application filed August 3, 1910. Serial No. 575,380.

*To all whom it may concern:*

Be it known that we, JOHN W. LITTLE and CHARLES W. KELLEY, citizens of the United States, residing at McCook, in the county of Redwillow and State of Nebraska, have invented certain new and useful Improvements in Hay-Rakes or Sweep-Rakes, of which the following is a specification.

Our invention relates to improvements in hay rakes, and the leading object of our invention is the provision of an improved adjustable horse rake for collecting hay and conveying the same to the stack or other place and there depositing the hay.

The further object of our invention is the provision of a horse rake having an improved adjustable frame bearing the teeth or fingers, which frame may be either vertically or swung pivotally, said adjustments being independent of each other and capable of employment either singly or jointly.

Another object of the invention is the provision of an improved hay rake by which the hay may be readily gathered up and which may be lifted from engagement with the ground to transport the hay and again shifted to dump the hay in a solid windrow instead of having the hay scattered at the sides thereof as generally occurs when the ordinary types of horse rakes are employed.

To attain the desired objects of our invention, we have provided a hay rake comprising a main frame supported by suitable wheels and having secured thereto by adjustable connections a supplemental frame provided with gathering fingers or teeth, said supplemental frame being pivotally adjustable with respect to the main frame and connections, the invention further residing in the novel features of construction and combination of parts, and especially in the means for securing the various adjustments of the supplemental frame, substantially as described and as illustrated in the accompanying drawings.

Figure 1 represents a perspective view of our complete machine. Fig. 2 represents a longitudinal vertical sectional view thereof with the teeth in position for collecting the hay, and, Fig. 3 represents a similar sectional view of the rake in position for transporting the hay.

In the drawings, in which similar characters of reference are employed to denote corresponding parts in the several views, the numeral 1 designates the main frame of our rake, having located at the front end thereof the axle 2 on which are mounted the supporting wheels 3 of our rake, caster wheels 4 being pivotally secured by the yokes 5 to the rear of the frame to facilitate the turning thereof, while rising from the rear of the frame is the driver's seat 6.

Pivotally secured to the forward ends of the frame 1 are the bell crank levers 7, said levers having their upper ends connected by the brace 8 and their lower ends by the brace 9, said brace being secured to the lower ends of the levers by bolts 10. Pivotally secured to the upper ends of the levers 7 by the bolts 11 which secure the brace 8 in position are the ends of the connecting rods or links 12, the other ends of said links 12 being pivotally secured by bolts 13 to the arms 14 and 15 of the rock shaft 16, said shaft being journaled in brackets 17 secured on the cross-beam 18 connecting the rear portions of the sides of the frame, while the arm 15 has an extension 19 having a hand-grasping portion or grip 20 thereon adapted to be engaged by the hand of the driver to move said arm 15 and thus to rock the shaft 16, the rocking of the shaft serving through the links 12 to rock the crank levers 7 on their pivots. The arm or lever 15 is provided with a lock-member 21 for engaging the segment 22 carried by the beam 18 for locking said arm and thus the levers 7 in adjusted position.

Pivotally secured by the bolts 23 to the lower ends of the crank levers 7 are the angle plates or brackets 24 having their other arm secured by bolts 25 to the cross-braces 26 connecting the members 27 and 28 which extend transversely of the main frame and comprise the supplemental frame of our rake, said members being further connected by the diagonal brace 29, as shown in Fig. 1. Secured to the under side of the member 27 and extending forward and likewise secured to the member 28 by the bolts 30 are the teeth or gathering fingers 31 of our rake, said fingers being spaced a distance apart and of ordinary construction.

Rising from the member 28 and secured thereto by the bolts 30 are the supporting bars 32 making an obtuse angle with the forward position of the fingers 31, while extending upward from the member 27 and at right angles to the fingers are the bars 33, said bars being secured together at their upper ends by the bolts 34, said bolts also serving to secure in position the transversely disposed rack beam 35, while a second similar member 36 is secured to the bars 32 intermediate their length, said members with their supporting bars forming a rack or abutment at the rear of the supplemental frame adapted to contact with the hay collected by the rake and retain it in position on the fingers and prevent its rearward movement but causing it to form a suitable pile upon the rake.

From the foregoing description taken in connection with the drawings the construction and operation of our improved rake will be readily understood and it will be seen that we have provided a rake having its supplemental frame pivotally supported from the levers 7 and that it may be swung upon said pivots to cause the teeth to move closely along the ground or be swung up therefrom to retain the hay on the fingers, while by the adjustment of said levers through the rock shaft 16 and links 12 the lower ends of the levers may be swung toward or away from the ground, thus varying the height above the ground at which the teeth are supported. To attain said pivotal adjustment of the supplement frame, I pivotally support on the post or brace 37 carried by the main frame the lever 38 having a grasping portion 39 and a latch 40 adapted to engage the segment plate 41 for securing the lever in adjusted position. Secured pivotally to the lower end of said lever are the links 42, said links extending forward and having slots 43 formed in their other ends in which are engaged pins 44 carried by certain of the bars 33, the slots permitting of a slight play of the pins and thus of a swinging of the supplemental frame when the levers 7 are adjusted instead of holding said frame substantially stationary as would otherwise be the case. It will be understood that the chief use of the lever 38 and its connections is to draw the bars 33 downward and rearward, thus swinging the front end of the fingers upward to retain the hay thereon for moving the same, the weight of the forward ends of the fingers counterbalancing the supplemental frame and normally tilting the same forward when not restrained by the said lever 38 and its connections.

It will be seen by reference to Fig. 3 that when we desire to remove the hay from the fingers, we depress the supplemental frame until it rests on the ground, when the hay will engage the ground between the fingers, and as the rake is moved rearwardly the hay will remain in position on the ground while the fingers slip from thereunder, leaving the hay in a neat pile or windrow. It will further be observed that we may have the entire raking frame close to the ground to clean the same, or the frame may be elevated and the points of the fingers depressed to scrape the ground, or the frame may be supported in a horizontal position near the ground, clearing off the drier better conditioned upper layer of the hay while leaving the under stratum, or the frame may be elevated and the finger-ends swung upward to transform the rake into a carrier to transport the hay.

We claim:

The hay rake herein shown and described, comprising the teeth forming the rake, the pair of transverse parallel bars secured upon the inner ends of the teeth, the vertical frame secured to the bars and composed of the series of pairs of inwardly inclined and vertical standards, the transverse strips connecting the standards forming the frame, the main frame connected to the rakes, the ground wheels carried by the frame, the pair of hand levers mounted in the frame, one of said levers having its lower end extending below the fulcrum, the pair of rods connected to the hand levers above the fulcrum, the cross-rod connecting the pair of rods at their forward ends, the angle levers having their lower ends connected to the rake and their upper ends connected to said pair of rods, and the pair of rods having their forward ends formed with slotted links connected to the frame and their outer ends secured to the lower extended end of one of the hand levers.

In testimony whereof we affix our signatures, in presence of two witnesses.

JOHN W. LITTLE.
CHARLES W. KELLEY.

Witnesses:
NAOMI WOOTTON,
CAL NELMO.